United States Patent [19]

Andersson et al.

[11] Patent Number: 5,000,058
[45] Date of Patent: Mar. 19, 1991

[54] APPARATUS FOR ROTATABLY MOUNTING A PEDESAL ON A BASE OF AN INDUSTRIAL ROBOT

[75] Inventors: Ake Andersson, Västerås; Ake Österberg, Eskilstuna, both of Sweden

[73] Assignee: Asea Brown Boveri AB, Vasteras, Sweden

[21] Appl. No.: 414,726

[22] Filed: Sep. 29, 1989

Related U.S. Application Data

[63] Continuation of Ser. No. 187,390, Apr. 27, 1988, abandoned.

[30] Foreign Application Priority Data

Apr. 29, 1987 [SE] Sweden .............................. 8701772

[51] Int. Cl.⁵ .............................................. B25J 9/10
[52] U.S. Cl. ........................................ 74/409; 901/25; 901/28; 403/50
[58] Field of Search .......................... 464/79, 98, 177; 901/25, 28; 475/317; 74/162, 409; 403/50, 51, 203, 291

[56] References Cited

U.S. PATENT DOCUMENTS

| 3,091,979 | 6/1963 | Schaefer, Jr. et al. | 464/79 X |
| 4,022,411 | 5/1977 | Rumsey | 248/580 |
| 4,062,601 | 12/1977 | Pardo et al. | 901/28 X |
| 4,606,695 | 8/1986 | Lenz | 901/28 X |
| 4,716,785 | 1/1988 | Godai et al. | 901/25 X |
| 4,840,090 | 6/1989 | Iwata | 901/25 X |
| 4,850,933 | 7/1989 | Osborn | 464/98 X |

FOREIGN PATENT DOCUMENTS

| 0288999 | 11/1988 | European Pat. Off. | 901/25 |
| 3701167 | 4/1988 | Fed. Rep. of Germany | 74/409 |
| 364764 | 8/1906 | France | 464/79 |
| 418820 | 6/1981 | Sweden . | |
| 838152 | 6/1981 | U.S.S.R. | 464/98 |

Primary Examiner—Leslie A. Braun
Assistant Examiner—Khoi Q. Ta
Attorney, Agent, or Firm—Watson, Cole, Grindle & Watson

[57] ABSTRACT

A drive unit on the pedestal of an industrial robot includes a gear unit having a hollow output gear shaft driven by a drive motor, and the base of the industrial robot includes a bearing on which the pedestal is rotatably mounted and whose axis of rotation is essentially coincident with the axis of rotation of the output gear shaft, and a torsionally rigid but otherwise flexible shaft coupling connects the output gear shaft to the base.

4 Claims, 3 Drawing Sheets

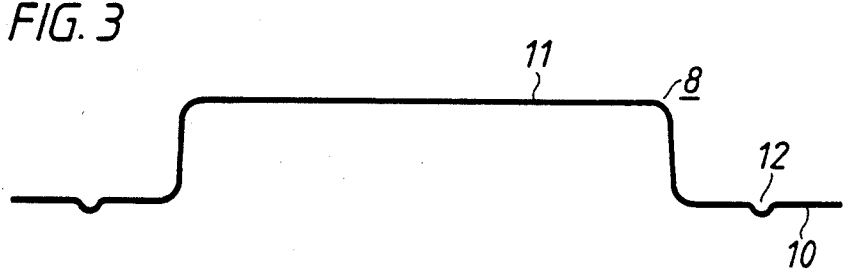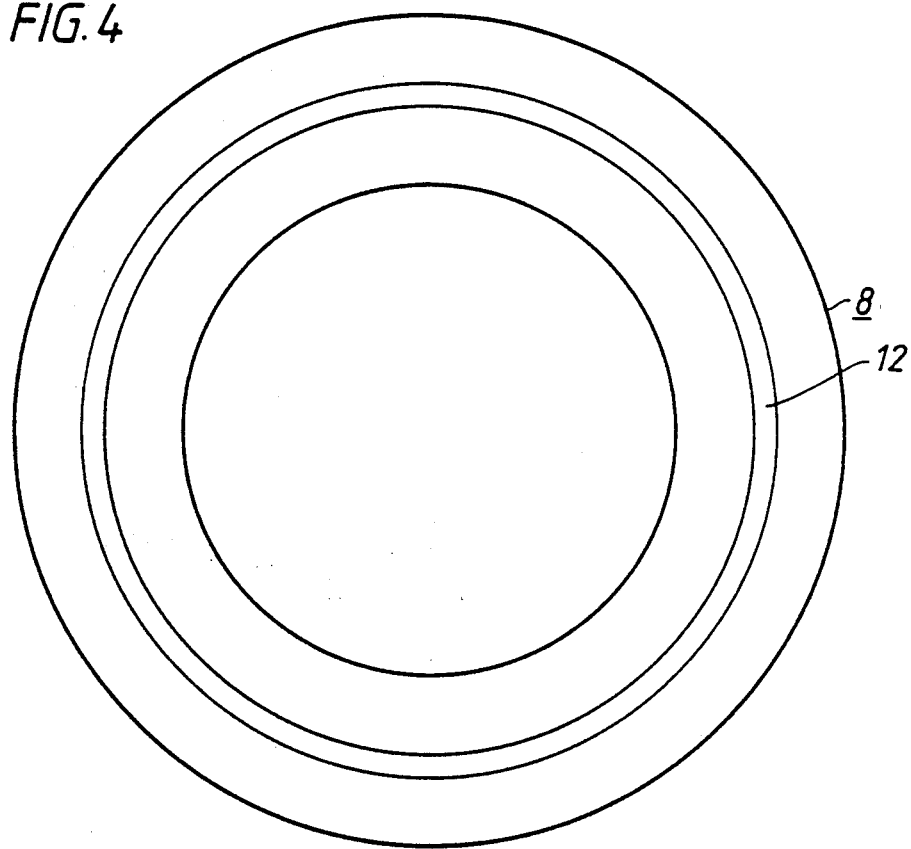

APPARATUS FOR ROTATABLY MOUNTING A PEDESAL ON A BASE OF AN INDUSTRIAL ROBOT

This application is a continuation, of application Ser. No 187,390, filed Apr. 27, 1988 now abandoned.

An industrial robot normally consists of a base and a rotatable pedestal which is mounted on the base and which, in turn, supports a robot arm. Increasingly higher demands are placed on the speed of action and precision of such a robot. Since, in addition, it is also desirable that the robot should be capable of handling increasingly heavier weights, special solutions have to be worked out to achieve a mounting of, for example, the pedestal of the robot in the base, without backlash, as well as a power transmission, also without backlash, between the drive motor for the pedestal and the drive shaft therefor. Otherwise problems will arise, even with position transducers arranged at suitable locations, when the robot arm with a high acceleration and a high deceleration is moved from one location to another.

To achieve a satisfactory mounting of the pedestal on the base, it is known to use a bearing and to mount on the pedestal a gear unit which is almost free of backlash, the drive shaft of the gear unit being coupled to a motor secured to the pedestal.

SUMMARY OF THE INVENTION

According to the present invention the output shaft of the gear unit is arranged with its axis of rotation practically coinciding with the axis of rotation of the bearing, the output shaft also being connected to the base by means of a torsionally rigid but otherwise flexible coupling.

In this way, the backlash in the power transmission is avoided while at the same time, because of the flexibility in other respects, it is not necessary to place unreasonably high demands on the alignment of the pedestal and its drive equipment. It is very difficult to cause the centre of the output shaft of the gear unit to completely coincide with the centre of the bearing. A difference of up to one or a few milimetres must be counted on. Furthermore, it is not so easy to cause the direction of the axis of rotation of the output shaft to become completely parallel to the direction of the axis of rotation of the bearing. There will often be a minor angular deviation between these axes. A coupling of the kind described above permits these deviations.

The coupling suitably consists of a plate in the form of a hat-shaped membrane, the hat-brim being fixed to the base and the centre of the crown of the hat being fixed to the output shaft of the gear unit. The crown of the hat increases the elasticity of the coupling while at the same time the coupling remains rigid in the direction of rotation. To further increase the flexibility of the coupling, one or more folds can be arranged in the brim, which folds run around the crown.

BRIEF DESCRIPTION OF THE DRAWINGS

The invention will be most readily understood with reference to the accompanying drawing, wherein FIGS. 3 and 4 show the actual membrane coupling.

DETAILED DESCRIPTION OF THE PREFERRED EMBODIMENT

Figure 1:
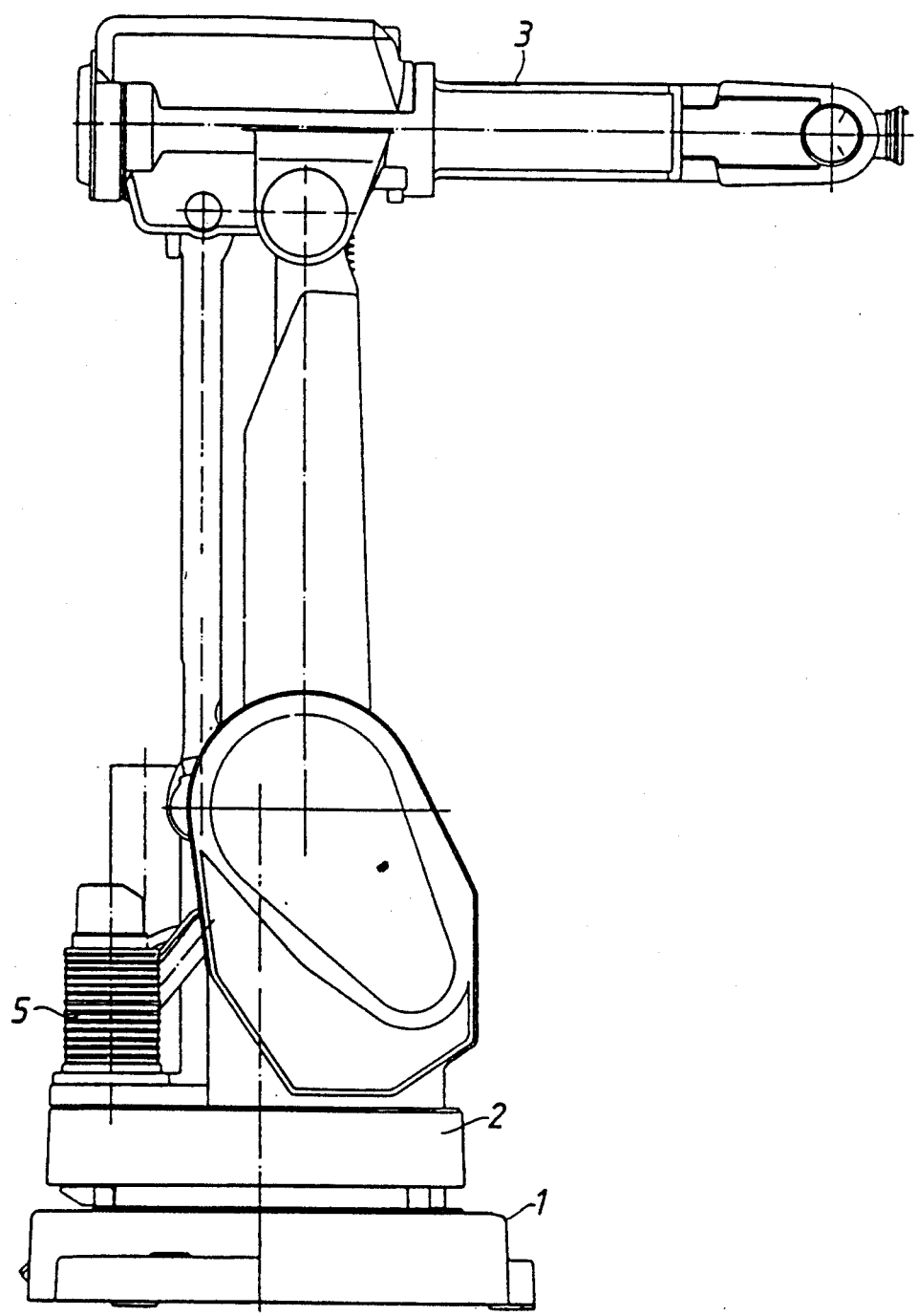
FIG. 1 shows a side view of the robot.
Figure 2:
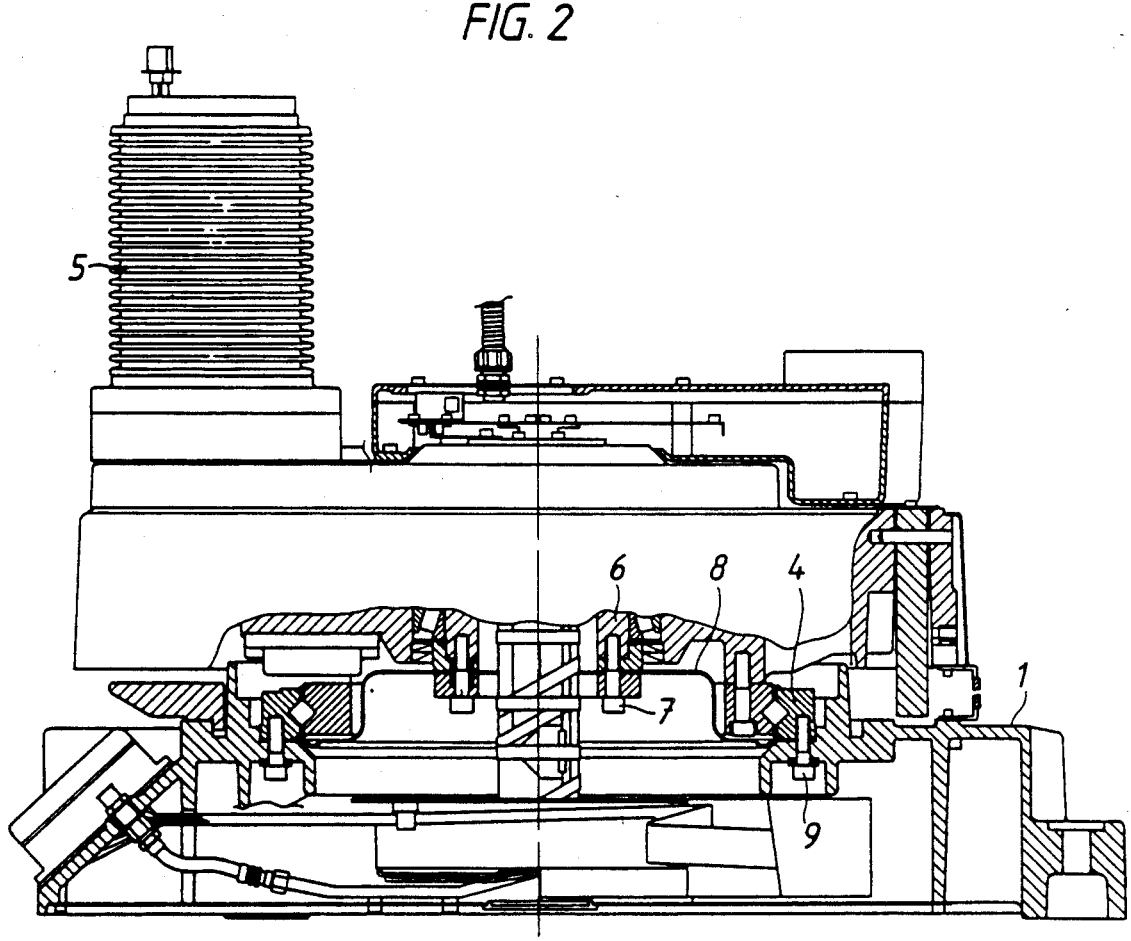
FIG. 2 shows a partially broken-away view of the base and the lower part of the pedestal.

In FIG. 1, 1 designates the base with the pedestal 2 and the robot arm 3. FIG. 2 shows the lower part of the pedestal 2 rotatably mounted on the base 1 by means of the bearing 4. A drive motor 5 drives a gear unit mounted in the pedestal 2 but concealed in FIG. 2. The gear unit has an output gear shaft 6 which is fixed by means of the bolt 7 to the hat-shaped plate coupling 8. The plate coupling 8, in turn, is connected around its outer edge to the base 1 by means of the bolt 9, which at the same time fixes the outer rim of the bearing 4. Accordingly, when the drive motor 5 is actuated, the pedestal 2 will rotate about the output gear shaft 6. The output gear shaft 6 is hollow and through it and a hole 8a in the centre of the plate coupling 8 there extend cables and hoses 8b for the supply of electric current and compressed air to the robot.

FIGS. 3 and 4 show the actual plate coupling 8 with its brim 10 and crown 11. A fold 12 is provided in the brim 10.

The robot operates such that, upon rotation of the pedestal 2, the motor 5 and the gear unit accompany the pedestal 2 around the output gear shaft 6 of the gear unit, the shaft remaining stationary together with the base 1 to which the output gear shaft 6 is fixed by means of the plate coupling 8. The plate coupling 8 may be given other membrane-like shapes without a crown but with several circular folds, etc.

What is claimed is:

1. An industrial robot which comprises a base which includes a bearing defining a first axis of rotation,
    a pedestal which is rotatably mounted on said bearing, said pedestal including a drive motor for a gear unit, said gear unit having a hollow output gear shaft forming a second axis of rotation for said pedestal,
    a torsionally rigid but otherwise flexible plate coupling fixedly connected to said output gear shaft and to said base, said plate coupling allowing angular deviation between first and second axes, said plate coupling including a central hole therein, and
    cables and hoses extending from said base through said central hole and through said hollow output gear shaft to said pedestal.

2. An industrial robot according to claim 1, wherein said plate coupling means comprises a hat-shaped element having a brim and a crown, said brim being fixedly connected to said base and said crown being connected at its center to said hollow output shaft.

3. An industrial robot according to claim 2, wherein said brim includes at least one fold to make said crown flexible.

4. An industrial robot according to claim 1, wherein said plate coupling is fixedly connected to said output gear shaft and to said base by bolts.

* * * * *